INVENTOR.
M. C. HIX

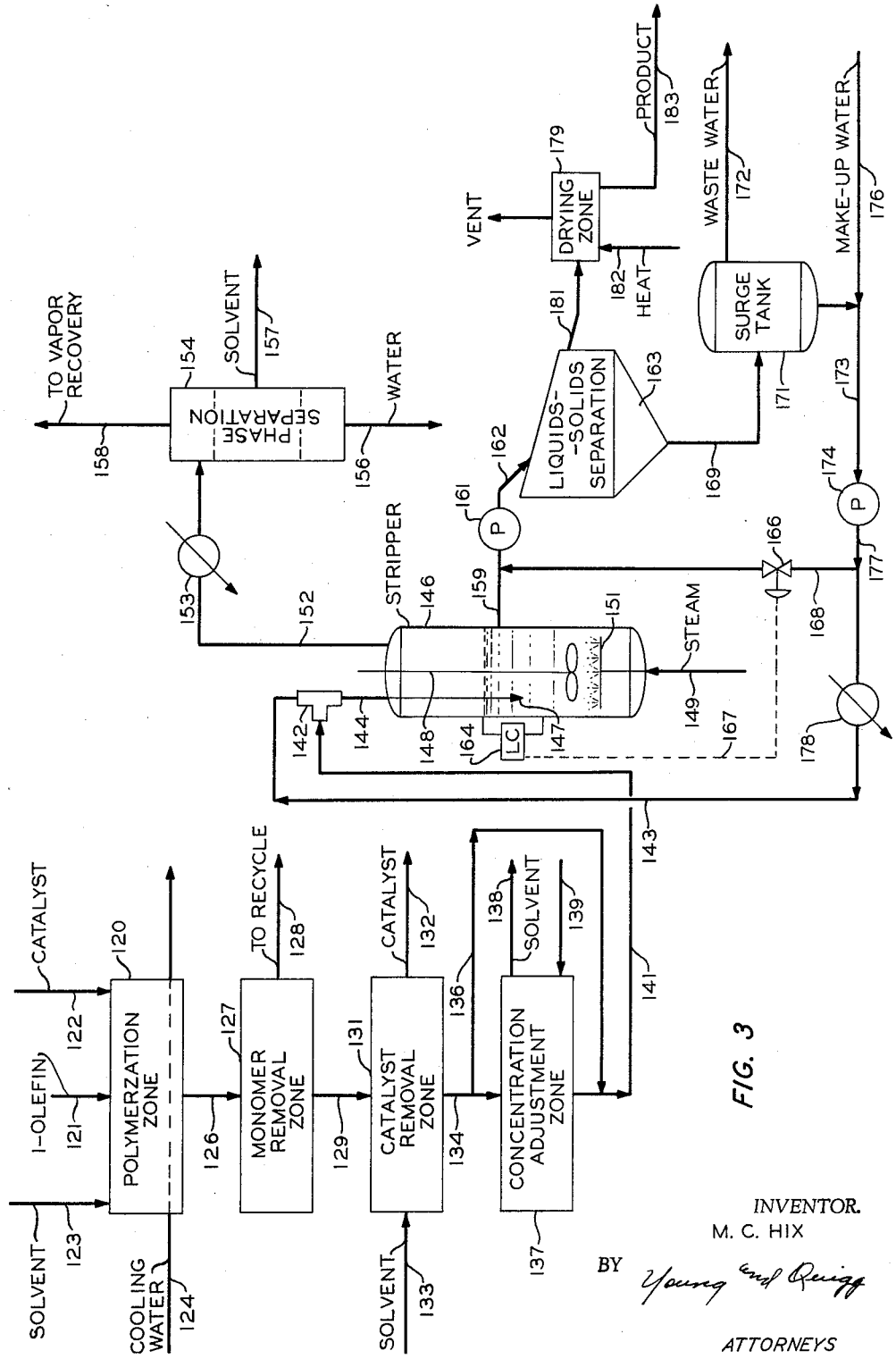

United States Patent Office 3,215,623
Patented Nov. 2, 1965

3,215,623
REMOVAL OF IMMISCIBLE LIQUID CONTAMINANTS FROM FLUIDS
Marvin C. Hix, Dumas, Tex., assignor to Phillips Petroleum Company, a corporation of Delaware
Filed Jan. 2, 1962, Ser. No. 163,526
14 Claims. (Cl. 210—24)

This invention relates to the removal of immiscible liquid contaminants from fluids. In one aspect this invention relates to the removal of oil and other immiscible liquid contaminants from water and aqueous solutions. In another aspect this invention relates to the removal of oil and/or other immiscible liquid contaminants from copper ammonium salt solutions used to purify ammonia synthesis gas.

The removal of entrained impurities such as suspended and/or emulsified liquid immiscible materials, including oil, from industrial waters and aqueous salt solutions used in various industrial treating processes is a major problem in many processes. It is not usually required that such industrial waters and solutions used for various cooling or treating operations be purified to the extent required for potable waters. Nevertheless, adequate purification of said waters, and solutions is in many processes a major problem.

For example, the purification of ammonia synthesis gas to effect the removal of carbon oxides can be provided by contacting said gas with a copper ammonium salt solution. Following this operation the salt solution is customarily regenerated to remove absorbed carbon oxides, refortified with acid, ammonia, copper, etc., as required to maintain its strength, and reused for purification of additional synthesis gas. The removal of the carbon oxides from the synthesis gas is customarily effected at high pressures, up to several hundred atmospheres or higher. In the compression of the synthesis gas to these high pressures, lubricating oil from the compressors often contaminates the gas. This heavy oil, which is immiscible with the salt solution, is scrubbed from the gas along with the carbon oxide and is removed with these oxides in the copper ammonia salt solution. To prevent build up of the lubricating oil in the circulating salt solution, this material is either periodically or continuously separated from the solution, for example, by introducing the solution to a suitable settling zone wherein skimming of the oil can be carried out.

Such settling and/or skimming operations remove only the oil which has separated from the salt solution. Entrained oil such as finely divided suspended oil droplets and/or emulsified oil are not removed. Said suspended and/or emulsified oil thus remains in the copper ammonium salt solution, is nearly always a chronic problem, and some better separation method has long been desired. Oil in copper ammonium salt solutions fouls the contacting surfaces in the absorbers and also contributes to other problems such as plating out of copper and maintaining the copper in solution in the cupric state. Sometimes the amount of suspended and/or emulsified oil remaining in the regenerated solution after the settling and/or skimming operation is so great that the problem becomes acute. Indeed, it sometimes happens that large amounts of the copper ammonium salt solution have to be discarded.

Many different contacting and/or filtering media including ground sea shells, sea sand, charcoal, Fiberglas, and diatomaceous earth have been tested for removing entrained immiscible liquid contaminants such as suspended and/or emulsified oil from water and other aqueous mediums such as copper ammonium salt solutions. However, for one reason or another, none of said contacting and/or filtering media have been successful. It is also known that plastic materials such as polytetrafluoroethylene, trifluoroethylene, and other fluoroethylene polymers have been proposed as contacting and filter media. However, it is usually required that such plastic materials either be sintered, or cold molded, or hot molded under relatively high pressures in the order of 100 to 3000 p.s.i. pressure so as to form a filter body which will even approach reasonably satisfactory operation in use.

I have now found that a particulate or granular, precipitated polymer of a 1-olefin (described further hereinafter) is an excellent contacting media for removing oil or other liquid immiscible contaminants from fluids such as gases, water, and aqueous salt solutions. Said precipitated polymers can be employed as a contacting media wihtout forming same into a formed body as by sintering and/or cold or hot molding under relatively high pressures.

Thus, broadly speaking, the present invention comprises removing an oil or other immiscible liquid contaminant from fluids such as gases, and aqueous mediums including water and aqueous solutions by contacting said fluids with a particulate or granular, porous, precipitated polymer of a 1-olefin containing from 2 to 8 carbon atoms per molecule and having no branching nearer the double bond than the 4-position.

An object of this invention is to provide a method for removing liquid immiscible contaminants from fluids such as gases, water, or aqueous solutions. Another object of this invention is to provide a method for removing liquid immiscible contaminants such as oil from fluids such as gases, water, and aqueous solutions by contacting said fluids with a particulate or granular, porous, precipitated polymer of a 1-olefin. Another object of this invention is to provide a new contacting media for removing oil or other liquid immiscible contaminants from fluids such as gases, water, aqueous solutions, and others. Another object of this invention is to provide an improved method for purifying ammonia synthesis gas. Another object of this invention is to provide a process for purifying copper ammonium salt solutions. Other aspects, and advantages of the invention will be apparent to those skilled in the art in view of this disclosure.

FIGURE 3 is a diagrammatic illustration of one method for manufacturing the granular, porous, precipitated polymers of 1-olefins employed in the practice of the invention.

Figure 1:
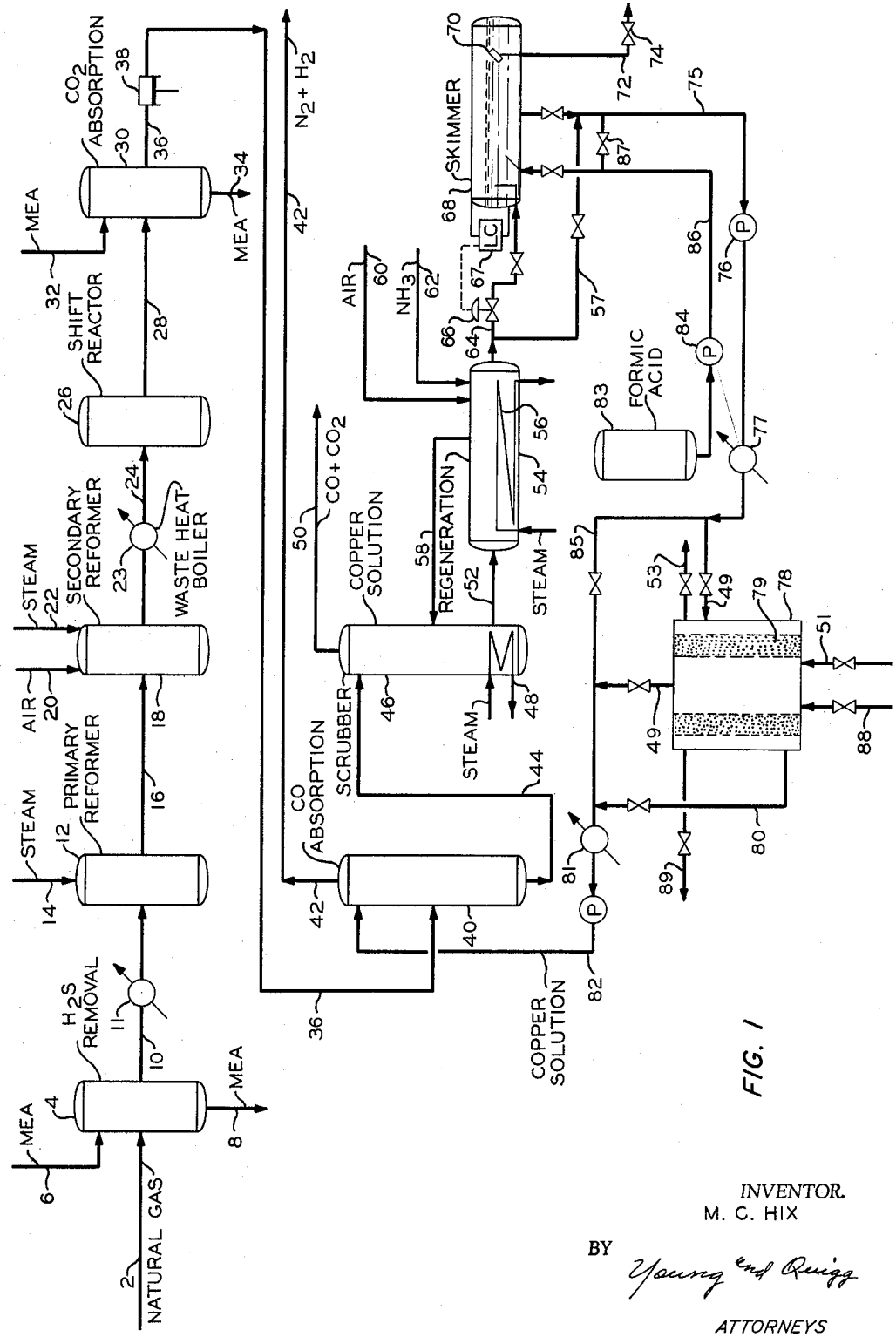
FIGURE 1 is a diagrammatic illustration of one embodiment of the invention as employed in an ammonia synthesis gas unit in the regeneration of copper ammonium salt solution used in removing carbon oxides from said synthesis gas.

Thus, according to the invention, there is provided a process for removing an immiscible liquid contaminant from a fluid, which process comprises: contacting said fluid in a contacting zone with a granular, porous, precipitated polymer of a 1-olefin containing from 2 to 8 carbon atoms per molecule and having no branching nearer the double bond than the 4-position; and recovering a substantially contaminant-free fluid from said contacting zone.

In one embodiment of the invention a granular, porous, precipitated polymer of a 1-olefin is slurried into the water, aqueous solution, or other liquid containing the suspended and/or emulsified liquid immiscible contaminant, such as oil, and said polymer adsorbs said liquid contaminant. Said polymer with the adsorbed contaminant on the surface thereof is then separated from said liquid, thereby removing the contaminant from said liquid. This embodiment of the invention can be carried out either batchwise or continuous. When operating as a continuous method, the finely divided, granular, porous, precipitated polymer is continuously stirred into the water, aqueous solution, or other liquid containing the suspended and/or emulsified liquid contaminant in a mixing zone, the resulting slurry is passed to a settling zone, and allowed to settle. The polymer having the liquid contaminant adsorbed thereon rises to the top of the liquid in the settling zone and is skimmed therefrom. A clear treated liquid is removed from the bottom of the settling zone. The amount of polymer employed in the practice of this embodiment of the invention is usually within the range of from 1 to 10 parts by weight of polymer per 1 part by weight of contaminant in the liquid being treated. A more preferred range is fram 1.5 to 4 parts by weight of polymer per 1 part by weight of contaminant.

In another embodiment of the invention, a fixed bed of the granular, porous, precipitated polymer is employed to contact the water, aqueous solution, or other fluid containing the immiscible liquid contaminant. In this embodiment of the invention, as will be understood by those skilled in the art, the flow rate through the fixed bed will depend upon the amount of liquid immiscible contaminant present in the fluid being treated, the nature of said contaminant, the nature of said fluid being treated, the amount of contaminant removal desired, the permissible pressure drop through the contacting bed, the particle size of the granular polymer, etc. Thus, the invention is not limited to any particular flow rates. As an example only, when oil is the contaminant and is present in the water or an aqueous solution in an amount in the order of 300 to 400 parts per million by weight, and it is desired to reduce the amount of oil contaminant to less than 40 p.p.m., with a pressure drop through the contact bed in the order of 0 to 5 p.s.i., the permissible flow rates through the fixed bed of polymer will be in the order from 0.25 to 3 gallons per hour per square foot of one-inch thick bed of 8 to 30 mesh precipitated polymer.

As indicated above, the invention is broadly applicable to the removal of liquid immiscible contaminant from fluids. The invention is particularly applicable to the removal of oil from water and aqueous solutions and finds one of its most advantageous uses in removing oil from copper ammonium salt solutions. Said copper ammonium salt solutions find use generally in the absorption of gases and in particular in the absorption of the carbon oxide, carbon monoxide and carbon dioxide. The following discussion is directed to an application of the invention wherein copper ammonium salt solution is utilized to remove carbon oxides from an ammonia synthesis gas. This is not intended, however, in any limiting sense and it is within the scope of the invention to treat copper ammonium salt solutions which have been used in any absorption process.

Ammonia synthesis gas is usually prepared by reacting a gaseous hydrocarbon, such as methane, with steam at elevated temperatures. The reaction can be carried out noncatalytically or preferably in the presence of a catalyst, such as, an oxide of nickel or cobalt. On addition to the nickel or cobalt oxide, other compounds can be added to the catalyst to promote the formation of the synthesis gas. The reaction, when catalyzed, is carried out in a temperature range usually between about 600 and 1000° C. Somewhat higher temperatures are required for the non-catalytic reaction, namely between about 1000 and about 1300° C. The process can be carried out at pressures from as low a few atmospheres to as high as several hundred atmospheres. The synthesis gas can be formed in a single stage operation or, if desired, two stages can be employed, with partial conversion of methane to carbon monoxide in the first stage and additional conversion of methane and further oxidation of a portion of the carbon monoxide to carbon dioxide in the second stage. While natural gas or methane is the preferred feedstock, other materials can also be employed in preparing the synthesis gas. Thus, in one method heavy hydrocarbon fractions are converted in the presence of oxygen or oxygen enriched air at more elevated temperatures to provide a non-catalytic conversion of the hydrocarbons to a mixture of hydrogen and carbon oxide. Following this operation nitrogen is added to the conversion gases to provide the desired ratio of hydrogen to nitrogen.

The raw synthesis gas contains a substantial quantity of carbon monoxide, and in order to provide additional hydrogen the gas is customarily contacted with a catalyst, such as iron oxide, which promotes the water gas shift reaction. In this reaction added steam reacts with carbon monoxide to form carbon dioxide and hydrogen. The shift reaction is usually carried out in a temperature range of between about 415 and about 440° C. and at substantially the same pressure as the synthesis gas formation. Leaving the water gas shift, the synthesis gas is passed through an absorption step in contact with an absorbent such as caustic or monoethanolamine, wherein the major proportion of carbon dioxide is removed. After this operation the synthesis gas is contacted with a copper ammonium salt solution for removal of the remaining carbon dioxide and carbon monoxide. The salt solutions which can be employed for this purpose include copper salts in general, for example copper ammonium acetate, formate, nitrate, chloride, sulfate, bromide, iodide, etc. Preferred salt solutions are copper ammonium acetate and copper ammonium formate.

The copper solution which is employed in purifying the ammonium synthesis gas is preferably reused, thus it becomes necessary to remove absorbed carbon oxides from this solution. This is effected by introducing the solution containing carbon oxides to a heated vessel wherein release of the oxides takes place. The regenerated copper solution is then available for reuse in purification of the synthesis gas. During the course of the treatment of the synthesis gas and regeneration of the copper solution portions of the copper solution and the various components contained therein are lost from the system. In order to maintain the strength of the copper solution it becomes necessary to either periodically or continuously introduce additional ammonia, copper and make-up acid to the system.

A typical newly prepared copper ammonium salt solution has the following approximate composition:

| | G./100 ml. |
|---|---|
| $Cu^{++}$ | 2.5–3.0 |
| Total Cu | 15 |
| Formic acid | 15 |
| Total $NH_3$ | 18 |

Such a solution is prepared as the formate salt and contains little or no carbonate. However, as the solution is used, the carbonate content gradually increases as $CO_2$ is dissolved from the gas stream being treated and finally reaches an equilibrium concentration at which the amount of $CO_2$ in the scrubber is equal to the amount driven off in the regenerator.

Referring now to the drawings, the invention will be more fully explained. In FIGURE 1 natural gas containing principally methane, with small quantities of ethane, propane and butane is introduced through conduit 2 to hydrogen sulfide removal vessel 4. In this vessel the gas is contacted with monoethanolamine introduced through conduit 6, and amine containing hydrogen sulfide is removed through conduit 8. The purified gas feed is then passed through conduit 10 and heater 11 to primary reformer 12 wherein the gas is contacted with nickel oxide catalyst in the presence of steam, introduced to the reformer vessel through conduit 14. The primary reformer is maintained at a temperature of about 700° C. and a pressure of about 35 p.s.i.g. whereby the major proportion of hydrocarbon is converted to carbon monoxide and carbon dioxide.

The effluent from the primary reformer is introduced to a secondary reformer 18 through conduit 16 wherein additional reforming is carried out in the presence of air and steam introduced to the reformer through conduits 20 and 22, respecitvely. The secondary reformer is maintained at a slightly higher temperature, that is about 840° C. In this vessel additional hydrocarbon is converted and a portion of the carbon monoxide present in the entering gas is converted to carbon dioxide. Sufficient air is introduced to the secondary reformer to provide an exit gas having a hydrogen to nitrogen mol ratio of about 3:1. The gases leaving the secondary reformer are cooled by passage through waste heat boiler 23 and are then introduced to shift reactor 26 through conduit 24. Additional steam (not shown) is added to the gas either before or after the waste heat boiler so that the resulting steam-gas mixture contains sufficient steam for the shift reaction. In the shift reactor the gases contact an iron oxide catalyst whereby the major proportion of the carbon monoxide present therein is converted with steam to carbon dioxide and hydrogen. This reaction is carried out at a temperature of about 430° C. and at about the same pressure as the secondary reforming step.

Following the shift reaction, the gases are passed through $CO_2$ absorber 30 wherein they are contacted with monoethanolamine for the removal of carbon dioxide. The amine is introduced to tower 30 through conduit 32 and is removed along with absorbed carbon dioxide through conduit 34. The gases leaving tower 30 are passed through conduit 36, compressor system 38, wherein they are increased in pressure to about 5000 pounds/sq. in. gauge, and are then introduced to CO absorption tower 40. In this vessel the gases encounter their final scrubbing, in this instance with copper ammonium formate solution, whereby remaining carbon dioxide and carbon monoxide are removed. The scrubbed gases, now comprising essentially hydrogen and nitrogen, in the mol ratio of about 3:1 are removed overhead from tower 40 through conduit 42 and transferred to the ammonia synthesis plant (not shown). Copper solution containing absorbed carbon monoxide and carbon dioxide is passed through conduit 44 to scrubber 46 when the carbon dioxide and carbon monoxide are released by the application of increased temperature. Heat required for this purpose is provided by steam introduced to reboiler 48 in the bottom of the scrubber and to steam coil 56, which is disposed in vessel 54. Regenerated copper solution passes from the bottom of scrubber 46 through conduit 52 into vessel 54 and gases are returned overhead from vessel 54 through conduit 58. The returned gases pass countercurrently to copper solution introduced through conduit 44, which solution aids in absorbing ammonia released in these gases. As required to make up materials lost from the system, ammonia is introduced to vessel 54 through conduit 62. To prevent precipitation of copper from the copper ammonium formate solution it is necessary that the relative amounts of cuprous and cupric copper in the solution be maintained within a predetermined range. To control this ratio air may be introduced to vessel 54 through conduit 60. Increasing the amount of air increases the quantity of cupric copper present in the solution.

During compression of the synthesis gas, prior to its introduction to the carbon monoxide absorption system, compressor lubricating oil is introduced to the flowing gas stream due to blow-by in compressor 38. This oil is absorbed by the copper ammonium formate solution along with the carbon monoxide and carbon dioxide, but is not released in regeneration of the copper solution. Prior to the invention, in order to effect removal of the major portion of this oil, which is immiscible with the copper solution, the regenerated solution was passed from vessel 54 through conduit 64 and control valve 66 into skimmer 68. The total flow of material into the skimmer was controlled by liquid level controller 67 which actuates control valve 66. In the skimmer the oil which separated accumulated at the liquid surface and passed into trough 70, being withdrawn from the skimmer through conduit 72 and valve 74. The copper solution, still containing an average of 400 parts by weight of oil per million parts by weight of solution, was withdrawn from the skimmer via conduit 75, and passed via pump 76, cooler 81 and conduit 82 into absorption vessel 40 for contacting synthesis gas from conduit 36.

In the practice of the invention said skimmer is not necessary, except possibly as a surge vessel, and the copper solution can, if desired, be passed through conduit 57 into conduit 75 and pump 76 and passed through heat exchange zone 77 which can be employed to adjust the temperature of said copper solution if desired. Usually no temperature adjustment is necessary. Said copper solution is then passed via conduit 49 into contact zone 78 wherein it contacts a fixed bed 79 of granular, porous, precipitated polymer of a 1-olefin, e.g., polyethylene, in accordance with the present invention. The copper solution, now essentially free of entrained oil, is withdrawn through conduit 80, cooled in cooler 81, and introduced via conduit 82 into absorption vessel 40 wherein it is contacted with synthesis gas which contains carbon monoxide and carbon dioxide. By-pass 85, the valve therein, and the valves in the conduits 49 and 80 to and from contact zone 78 are provided for regulating the amount of copper solution passed through said zone 78. Thus contact zone 78 can be employed to treat the entire stream in line 74 or any portion thereof, depending upon the size of said stream, the size or capacity of said zone 78, and the amount of oil in said stream.

When spent, the polymer in contacting zone 78 can be regenerated by steam distillation with steam introduced through conduit 88 and the resulting vapors withdrawn through conduit 89. When a solvent is employed to regenerate the polymer solvent is introduced through conduit 51 and withdrawn through conduit 53. Further details regarding the regeneration of the polymer are given hereinafter in connection with the discussion of FIGURE 2.

As shown above, contact zone 78 comprises a cylindrical contacting bed 79 formed in a perforated double-walled cylinder mounted in a suitable vessel. The copper solution is introduced into the annular space surrounding said bed, passes through said bed, and is withdrawn from the central space with said bed. If desired, the granular, precipitated polymer can be compacted in said bed under compression by means not shown such as an annular plug placed between the top of the bed and the top of the vessel so that when the vessel is closed the polymer within the cylinder will be compressed.

Such compacting of the contact bed is not essential in the practice of the invention. Excellent results of better than 90 percent oil removal have been obtained when contacting oil-containing copper ammonium formate solutions with a bed of granular, porous, water precipitated polyethylene which was under 0 p.s.i. compression. However, since compacting or compressing, along with particle size, affords control of the porosity of the bed, it is frequently preferred to employ some compression. Usually, when employed, the amount of compression will be within the range of 0 to 30 pounds per square inch, preferably 0.5 to 20 p.s.i., more preferably 1.5 to 8 p.s.i.

It is one of the outstanding advantages and features of the invention that the precipitated polymer employed therein does not have to be compressed or formed into a body.

Along with the addition of ammonia to the circulating copper solution, it is also necessary to add copper and formic acid to replace losses from the system. The formic acid, which is obtained from vessel 83, is passed through pump 84 and conduit 86 and introduced into a lower part of skimmer 68 at a point adjacent to the suction of pump 76, i.e., near outlet conduit 75. In this manner the acid is quickly withdrawn from the vessel and evenly dispersed in the circulating copper solution by the turbulent mixing action of the pump 76. The acid is introduced to the suction of the pump in the form of a small stream, and continuously, to limit the quantity introduced to a minimum. The portion of the solution to which the acid is introduced, being below the surface level in the skimmer, contains a low concentration of oil. As shown in the drawing, the acid can be introduced alternatively through valve 87 and directly into conduit 75.

Figure 2:
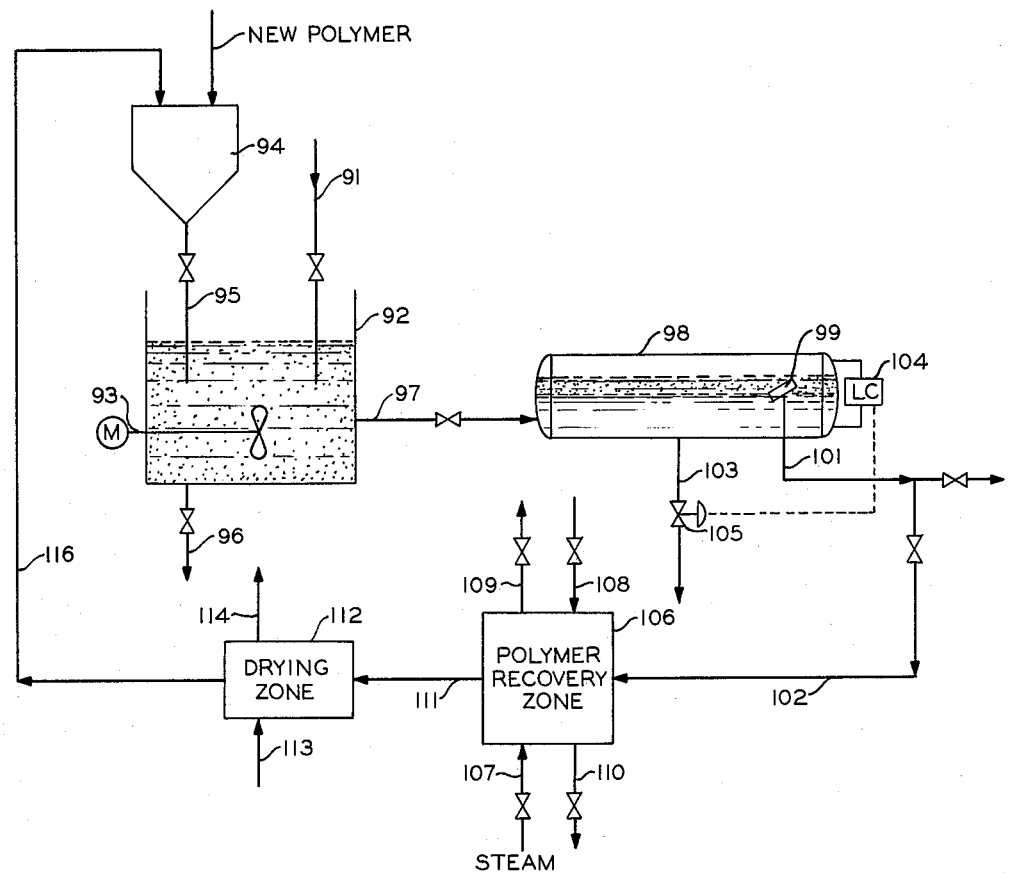
FIGURE 2 is a diagrammatic illustration of another embodiment of the invention.

Referring now to FIGURE 2, there are illustrated other embodiments of the invention. In these embodiments of the invention, the granular, porous, precipitated polymer of a 1-olefin is slurried into a liquid such as water or aqueous solution having an immiscible liquid containment such as oil suspended and/or emulsified therein. When the contacting of the polymer and the liquid being treated is carried out batchwise, said liquid is introduced via conduit 91 into a contacting vessel 92 provided with stirring means 93. Said polymer is introduced in vessel 91 from hopper 94 via conduit 95. Said contacting vessel 92 is here illustrated as being an open receptacle or tank but can comprise any suitable vessel such as a closed vessel suitable for carrying out the operation under pressure, if desired. Likewise, said stirring means 93 which is here illustrated as an impeller mounted on the end of a rotatable shaft can be any other suitable agitating means. For example, instead of being introduced separately as here illustrated the liquid containing the entrained immiscible liquid containment and the granular, porous, precipitated polymer can be introduced together into the suction of a centrifugal pump, mixed therein, and discharged into said tank 92. After the polymer and liquid have been thoroughly slurried, the agitation is stopped, and the contents of vessel 92 permitted to remain quiescent for a sufficient period of time to allow said contents to settle. The polymer having the adsorbed containment thereon rises to the top and a clear liquid is withdrawn from the bottom of vessel 92 through conduit 96.

In continuous operations, polymer and liquid to be contacted are continuously introduced into said vessel 92 and stirring means 93 is continuously operated. The resulting slurry is continuously withdrawn through conduit 97 and passed into settling and skimming vessel 98 which is of sufficient size to provide sufficient residence time therein to permit the polymer, having adsorbed containment thereon, to rise to the surface of the liquid in vessel 98. Said polymer accumulates at the top of the liquid surface, passes into trough 99, and is withdrawn through conduit 101 and discarded, or passed through conduit 102 into polymer recovery zone 106. Clear liquid, essentially free of entrained oil, is withdrawn from vessel 98 through conduit 103. If desired, the withdrawal of said clear liquid can be controlled by means of liquid level controller 104 which actuates control valve 105.

In said polymer recovery zone 106 the polymer having the adsorbed liquid containment thereon is regenerated by steam distillation with steam introduced through conduit 107, or a suitable solvent introduced through conduit 108. When steam distillation is employed, the resulting vapors are removed through conduit 109 and can be either vented or passed to a suitable recovery zone for recovery of the oil or other containment if such is desirable. Said steam distillation can be carried out in any suitable manner and apparatus commonly employed for the removal of adsorbed liquids from porous solids. Obviously, whether or not steam distillation is employed will depend upon the boiling point of the oil or other liquid immiscible containment adsorbed on the polymer and/or the melting point of said polymer.

When it is not convenient, for one reason or another, to employ steam distillation, the used polymer can be recovered by washing with a suitable solvent introduced through conduit 108 as described and solvent containing dissolved containment is withdrawn through conduit 110 and passed to a suitable solvent recovery zone for reuse in the process. Suitable solvents which can be employed to recover said polymer include hydrocarbon solvents such as pentane, hexane, cyclohexane, benzene, xylene, etc.; hydrocarbon mixtures such as kerosene, gasoline, naphtha, etc.; or organic solvents such as acetone, carbon tetrachloride, etc. Any solvent which does not react with the containment being removed fom the polymer or which does not exert any solvent action upon said polymer is a suitable solvent for use in the practice of the invention.

The cleaned polymer is passed via conduit 111 into drying zone 112 which can comprise any suitable apparatus for drying the polymer. For example, said drying zone can comprise a rotary kiln provided with means for rotating same and heat can be introduced therein by means of a hot inert gas introduced through conduit 113 and vented through conduit 114. The dried polymer is then removed from the drying zone and passed via conduit 116 into hopper 94 for reuse in the process. Said conduit 116 can comprise any suitable conveying means such as a mechanical elevator or a suitable gas lift arrangement.

The following examples will serve to further illustrate the invention.

*Example I*

A first test run was carried out wherein copper ammonium formate solution from a commercial plant and containing suspended and/or emulsified lubricating oil, such as that from line 75 in FIGURE 1, was contacted in a contacting unit containing a fixed bed of 12 to 14 mesh granular, porous, water precipitated polyethylene. Said polyethylene contact media was compacted in a cylindrical bed about 1.25 inches thick and under a compression of approximately 7 pounds per square inch in a unit essentially like unit 78 in FIGURE 1. Said copper ammonium formate solution was passed through the unit at an average rate of approximately 1.3 gallons per hour per square foot of contactor. The oil content of said copper ammonium formate solution entering the contact unit averaged 400 parts by weight of oil per million parts by weight of said copper solution. The test run was conducted over a 15-day period during which the effluent from the contact unit was sampled ten times at spaced intervals of never less than 24 hours. The average oil content in the effluent from said contact unit was 19 parts by weight of oil per million parts by weight of treated copper solution. The last sample on the fifteenth day of the test run showed an oil content of 15 parts by weight of oil per million parts by weight of treated copper solution. Thus, the average oil removal by the polymer in the contact unit was 95.2 percent of the oil contained in the copper ammonium formate solution to the filter.

*Example II*

A second test run was carried out on another portion of said stream of copper ammonium formate solution used in Example I. In this test run the contact unit contained a cylindrical fixed bed of the same water precipitated, porous, granular polyethylene as used in Example I except that the particle size was 16–20 mesh. Said polyethylene filter media was compacted under a compression of approximately 2 pounds per square inch in a unit like that employed in Example I. The copper ammonium formate solution was passed through the contacting unit at an average rate of 1.3 gallons per hour per square foot for a period of 29 days. During said test period the effluent from the contacting unit was sampled 18 times at spaced intervals of never less than 24 hours. The average oil content of said effluent was 42 parts per million. The last sample on the twenty-ninth day showed an oil content of 30 parts per million. Thus, the average oil removed by the contacting unit during the period of test was 89.5 percent of the oil contained in the copper ammonium formate feed. A sample of said 16–20 mesh, porous, granular, water precipitated polyethylene had an apparent bulk density of about 19.6 pounds per cubic foot when compacted under a compression of 2 p.s.i.

*Example III*

A third test run was carried out wherein a commercial copper ammonium formate solution from a commercial plant and containing suspended and/or emulsified oil, such as that from line 75 in FIGURE 1, was contacted with 14 to 20 mesh ground polyethylene prepared by grinding extruded pellets of polyethylene. This ground polyethylene, having been prepared from an extruded polyethylene, is essentially non-porous. The polyethylene contacting agent used in this test run was prepared in the same manner as the polyethylene contacting media used in the above Examples I and II (see FIGURE 3 and the description thereof) except that the water precipitated polymer from drying zone 51 was passed to an extrusion zone wherein the polymer was melted and extruded into approximately 3/16-inch pellets. Said pellets were then ground to obtain the above-described 14 to 20 mesh ground extruded polyethylene. A filter unit like that employed in Example I and II was charged with said ground polyethylene which was compacted under a compression of approximately 2 pounds per square inch. The copper ammonium formate solution containing an average of 400 parts by weight of oil per million parts by weight of solution was passed through said filter unit at an average rate of approximately 1.3 gallons per hour per square foot. The test was continued over an 18-day period. During the test period the flow through the contacting unit was erratic and considerable difficulty was encountered due to plugging. The copper ammonium formate solution did not contain sufficient foreign matter, such as solids, for said solids to contribute significantly to said plugging. During said test period the effluent from the contacting unit was tested seven times at spaced apart intervals of never less than 24 hours. The average oil content of said effluent was 288 parts per million. The last sample on the eighteenth day of the test showed an oil content of 384 parts per million. Thus, the contacting unit removed an average of only 28 percent of the oil contained in the copper ammonium formate feed solution. A sample of said 14–20 mesh ground polyethylene had an apparent bulk density of about 37 pounds per cubic foot when compacted under a compression of 2 p.s.i.

A comparison of the results given in the above Examples I, II, and III shows that the granular, porous, precipitated polyethylene is much superior to the ground extruded polyethylene for the removal of oil from aqueous copper ammonium salt solutions. For example, in Examples I and II when using the granular, porous, precipitated polyethylene contacting media the amount of oil removed from the copper ammonium formate solution was 95.2 and 92.5 percent respectively, whereas in Example III, when using the ground extruded polyethylene only 28 percent of the oil content of the copper ammonium formate solution was removed.

*Example IV*

In another test run, water which has been employed in a water scrubber for water washing compressed hydrocarbon gases, and containing approximately 200 parts by weight of oil per million by weight of water of suspended and emulsified lubricating oil originally entrained in said gases during compression, is slurried in a tank with 16 to 20 mesh granular, precipitated, porous polyethylene of the same type as used in Example II. Said polyethylene is used in an amount of about 3 parts by weight of polyethylene per part by weight of oil. After thoroughly slurrying said polyethylene and said water, the mixture is allowed to settle. The polyethylene containing adsorbed oil rises to the top of the slurrying vessel and clear water essentially free of entrained oil is withdrawn from the bottom of the vessel. Upon analysis it is found that said clear water contained approximately 14 parts per million of oil showing that approximately 98 percent of the oil contained in the original water had been removed.

The above Examples I, II, and IV show that the granular, porous, precipitated polyethylene of the invention is an efficient contacting media for removing suspended and/or emulsified liquid immiscible contaminants, such as oil, from water and aqueous salt solutions.

The polymers employed in the practice of the invention are granular, porous, precipitated polymers of 1-olefins containing from 2 to 8 carbon atoms per molecule and having no branching nearer the double bond than the 4-position. A presently preferred class of such polymers are those prepared by the process disclosed and claimed in Hogan et al. Patent 2,825,721, issued March 4, 1958.

In said patent there is disclosed and claimed a process for producing polymers of 1-olefins by carrying out the polymerization at a temperature in the range of 100 to 500° F. in the presence of 0.1 to 10 or more weight percent of chromium as chromium oxide, include a substantial proportion of hexavalent chromium associated with at least one porous oxide selected from the group consisting of silica, alumina, zirconia, and thoria. A preferred catalyst is one comprising 0.1 to 10 weight percent chromium as the oxide on a silica-alumina support such as 90 percent silica 10 percent alumina. This catalyst is a highly oxidized catalyst which has been activated by high-temperature treatment under non-reducing conditions and preferably with an oxidizing gas. Olefins, other than 1-olefins as described, are polymerized by the action of this catalyst but many of the resulting polymers are preponderantly normally liquid at least when polymerized under the described conditions. The polymerization is suitably carried out in the liquid phase, such as in solution in a hydrocarbon solvent, especially a paraffin or naphthene which is liquid under the polymerization conditions; however, vapor phase operation or mixed phase operation can be effected. Also, diolefins can be polymerized by the chromium oxide catalyst to produce solid polymers. Polymers as prepared by other catalyst systems can also be precipitated by the method described below, e.g., polymers prepared by the organo-metallic catalyst as disclosed by Karl Ziegler in Belgium Patent 533,362, and are thus also suitable for use in the practice of the present invention.

According to the water precipitation method disclosed and claimed in copending application Serial No. 712,908, filed February 3, 1958, by R. G. Wallace, now Patent 3,056,772, issued October 2, 1962, a polymer of a 1-olefin dissolved in a hydrocarbon solvent is dispersed in water under conditions of pressure and temperature to maintain the solvent and water in the liquid phase, the resulting dispersion temperature is regulated so that the polymer is substantially all precipitated and the resulting solids are separated from the resulting two-phase liquid dispersion.

The polymeric materials to which this precipitation method and the present invention are particularly applicable are polymers of 1-olefins. Polymers of 1-olefins containing 2 to 8 carbon atoms and having no branching nearer the double bond than the 4-position have been found in recent years to have superior heat resistance and superior temperature properties when polymerized at relatively low temperatures and pressures. The herein identified method of Hogan et al. is one such low temperature-low pressure method. As indicated above, it is preferable to carry out the polymerization in a hydrocarbon solvent.

Examples of the preferred 1-olefins include ethylene, propylene, 1-butene, 1-pentene, 1-hexene, 1-octene, 4-methyl-1-pentene, 4-methyl-1-hexene, 5-ethyl-1-hexene, 6-methyl-1-heptene, 4-ethyl-1-hexene, and the like. It is also within the scope of the invention to employ copolymers of said 1-olefins. Thus, as employed herein and in the claims, unless otherwise specified, the term "polymer" includes homopolymers of said 1-olefins and copolymers of one of said 1-olefins with another of said 1-olefins as a comonomer. The 1-olefins having from 2 to 4 carbon atoms per molecule are usually preferred for preparing the polymers employed in the practice of the invention.

An example of a copolymer suitable for use in the practice of the invention is a copolymer of ethylene with 1-butene having from 1 to 10, preferably 1.5 to 5, more preferably 1 to 3 weight percent of the 1-butene comonomer incorporated into the copolymer molecule.

The solvents especially useful in polymerization of the 1-olefins are hydrocarbons and preferably paraffins including cycloparaffins. These diluents include paraffins and cycloparaffins having 3 to 12 carbon atoms per molecule. Any of the paraffins or cycloparaffins which are a solvent for the polymer at the temperature in the polymerization range are suitable. Any hydrocarbon which is relatively inert, non-deleterious, and liquid under the operating conditions of the process can be utilized. Diluents that have been used successfully in the polymerization reaction include n-butane, isobutane, normal pentane, isopentane, isooctane (2,2,4-trimethyl pentane), cyclohexane and methylcyclohexane. Unsaturated aliphatic and cyclic hydrocarbons are, in general, not used in the polymerization reaction since they are likely to enter the polymerization reaction. However, any of these hydrocarbons are operable.

In the preferred operation, a hot polymer solution having a concentration in the range of 1 to 8 percent polymer is dispersed in 1 to 5 volumes of cool water to obtain the desired temperature under pressure conditions to maintian substantially all of the solvent and water in the liquid state until the polymer is precipitated and then the solvent is flashed off and the polymer is recovered. More preferably, the concentration of polymers in solvent will be in the range of 2 to 5 percent. However, it should be understood that the method is applicable to other concentrations both higher and lower and is operable with other water to solution ratios. The important thing is to cause the polymer to precipitate while the solvent and water are in the liquid state, i.e., before any substantial vaporization is permitted. It has been found that while working in the above ranges, these conditions are readily obtainable.

The residence time in the dispersion zone must be sufficient to allow the polymer to completely harden. This time will be dependent upon the final mix temperature. For example, when recovering polyethylene prepared by the Hogan et al. method in cyclohexane with a final mix temperature of 105–115° F., time in the range 4 to 8 seconds is sufficient. On the other hand, with a final mix temperature in the range 140–148° F., the residence time should be in the range 30 to 35 seconds. As the final mix temperature approaches the precipitation temperature of the polymer, the time required becomes longer. As a practical consideration the maximum final temperature will generally not exceed about 150° F. and the residence time will not generally exceed about 60 seconds. With other polymers, these temperatures and times may vary. However, having been given this disclosure, it is within the skill of the art to determine the time and temperature required.

Referring now to FIGURE 3 of the drawings, a feed stream consisting essentially of the polymerizable 1-olefin, ethylene for example, is passed to polymerization zone 120 via conduit 121. Catalyst is introduced to said polymerization zone via conduit 122. The catalyst will usually be dispersed in at least a portion of the solvent. Any additional solvent (cyclohexane) is added to polymerization zone 120 via conduit 123. The ingredients in each of these conduits 121, 122, and 123 are preferably at polymerization temperatures (230–300° F.); however, one or more streams can be cooler with remaining streams warmer so that the resulting dispersion is at the proper temperature. It should also be understood that the 1-olefin and solvent can be premixed, if desired. The polymerization reaction is exothermic so that it is necessary to remove heat from the polymerization zone. This can be accomplished by indirect heat exchange, for example, cooling water in conduit 124. The polymerization zone effluent, at about 280° F. from zone 120 passes via conduit 126 to monomer removal zone 127 wherein unreacted ethylene is vaporized and removed via conduit 128 to ethylene recycle. The mixture passes from monomer removal zone 127 via conduit 129 to catalyst removal zone 131 wherein the solution and catalyst are separated. The catalyst is removed via conduit 132 such as flushing with solvent from conduit 133. The polymer solution is passed from separation zone 131 via conduit 136. In general, the polyethylene concentration in conduit 134 is low and solvent is removed from zone 137 via conduit 138. On the other hand, if the concentration is high, solvent can be added via conduit 139. The solution is cooled in this zone, either by evaporation or by cool solvent to about 240° F. The polyethylene concentration is adjusted to about 4.5 percent polymer in this example. In any case the polymer solution is dispersed in water of lower temperature so as to cause polymer to precipitate under such conditions that both the water and solvent remain as liquid phases.

In the embodiment here described, the solution passes from conduit 141 to mixing T 142 where it is mixed with cool water from conduit 143. The mixtture is maintained in the conduit 144 until the polymer is precipitated. In the embodiment shown, the conduit 144 extends into stripping zone 146 to a point below the surface of the liquid level wherein the dispersion is introduced directly into the body of the liquid via nozzle 147. This nozzle also holds the pressure on the mix zone 144 sufficiently high to prevent flashing of solvent. In the embodiment shown, sufficient water is admixed with the solution to provide a resulting mix temperature in the range 105 to 115° F. and conduit 144 is large enough to provide a residence time of 4 to 8 seconds. This stripping zone can be operated at any desired temperature and pressure so long as solvent is vaporized. Preferably, the stripper will operate at atmospheric pressure and at about 170° F. However, under vacuum, the temperature will be lower, e.g., 140° F. for 7 p.s.i.a. Since the polymer is lighter than water and will float, an agitator 148 is provided to maintain the solids in dispersion This agitator is rotated at a speed preferably in the range of 25 to 200 r.p.m. and in this example at about 85 r.p.m. While any means of supplying heat in the stripping zone can be used, steam is especially effective. Steam from conduit 149 is supplied to the steam stripper via steam nozzle head 151.

Steam and solvent vapor pass overhead from stripping zone 146 via conduit 152 to condenser 153, where most of the vapors are condensed, and then pass to separation zone 154. The solvent and water form two layers in this zone 154 and water is removed via conduit 156 while solvent is removed via conduit 157. Non-condensibles and uncondensed vapor pass overhead from zone 154 via conduit 158.

The polymer residence time in stripping zone 146 is in the range of 20 to 30 minutes. Polymer in water slurry is removed from zone 146 via conduit 159 to constant volume pump 161 which may serve as a grinder and conduit 162 to separation zone 163. One convenient means for separating polymer and water is a skimmer tank, however, any suitable means can be employed.

The stripper 146 is provided with a liquid level control 164 which is operably connected to valve 166 via linkage 167. Valve 166 is operably installed in conduit 168 to regulate the flow of recycle water in conduit 168 to conduit 159 so that constant volume pump 161 controls the level in stripper 146 at the desired level.

Water from separation zone 163 passes via conduit 169 to surge tank 171. Conduit 172 is provided in surge tank 171 to remove excess water if required. The necessity for removing or adding water will be determined by the net loss or gain of water in stripping zone 146. The water in tank 171 will be at about the temperature maintained in said stripping zone, e.g., 170° F., in this example. This hot water is removed from the surge tank 171 via conduit 173 and pump 174. Make-up water can be added via conduit 176. If added at this point, the water should be preheated. If cold water is added, it should be added to conduit 143. The water from pump 174 is removed via conduit 177 and a portion passed through cooler 178 to conduit 143 and a portion passed as recycle to conduit 159 via conduit 168 as desired to maintain the liquid level in stripper 146.

The polymer from liquid-solids separation zone 163 is passed, still damp but having the solvent essentially replaced by water, to drying zone 179 via conduit 181. Heat is introduced into drying zone 179 via conduit 182. In this example, a forced draft dryer using air at 250° F. produced a dried polymer of 99.7 weight percent solids with a resistance time in the range 2 to 4 hours. The dried polymer having a bulk density within the range of 12 to 20 pounds per cubic foot was removed via conduit 183 as product for use in accordance with the present invention. The bulk density of said polymer is usually within the range of 15 to 16 pounds per cubic foot.

Commercial polymers of 1-olefins, such as polyethylene, are prepared by passing the dried product from conduit 183 to an extrusion zone wherein the polymer is melted and extruded into the various forms in which bulk polymers are sold commercially. Thus, the granular, porous, precipitated product from conduit 183 which is employed in the practice of the invention is an intermediate product in the manufacture of commercial extruded polymers.

The product from conduit 183 can be employed, as is, in the practice of the invention. A screen analysis of a typical sample of said product, using U.S. Standard screens, is as follows:

|  | Wt. percent |
|---|---|
| Retained by 8 mesh screen | 17.6 |
| Pass 8 but retained on 30 mesh screen | 77.2 |
| Pass 30 but retained on 50 mesh screen | 4.1 |
| Pass 50 but retained on 100 mesh screen | 0.8 |
| Pass 100 mesh screen | 0.3 |

In order to obtain uniformity in the contacting bed, reduce the possibility of channeling due to large particles, and reduce the possibility of excess pressure drop due to small particles, it is preferred to employ the 8–30 mesh fraction, more preferably the 16–20 mesh fraction, of the polymer product from conduit 183.

Said polymers employed in the practice of the invention can also be prepared by precipitation from solvent solutions. In carrying out this method of polymer precipitation, effluent from a polymerization reaction, comprising a mixture of olefin polymer and hydrocarbon solvent, such as from conduit 141 in FIGURE 3, which has been treated for the removal of catalyst and unreacted olefin, is introduced to a batch cooling zone. Generally, several zones are provided in parallel so that reaction effluent is continuously entering at least one zone. However, if desired, the operation can be carried out with only one cooling zone by providing surge capacity for the reaction zone effluent. After filling of the cooling zone is completed, the flow of material thereto is stopped and cooling of the solution in the zone is commenced whereby there is provided a uniform controlled decrease in temperature. The solubility of the olefin polymers in the solvent material is a function of temperature and as the material is cooled, polymer begins to precipitate from solution. The cooling process is continued until the desired quantity of polymer is precipitated therefrom, after which the cooling zone is emptied and the contents are passed through a separation step wherein precipitated polymer is separated from the solvent.

To provide a homogeneous product of the desired particle size, it is necessary that the rate of cooling be carefully controlled to provide a uniform drop in temperature in the polymer solution. Cooling at too slow a rate produces a product having a very fine particle size which is difficult to filter. Shock chilling on the other hand frequently produces an agglomerated material which also presents recovery problems. In general it has been found desirable to cool the solution between about 1° F. and about 20° F. per minute and preferably between about 5° F. and about 15° F. per minute. For the best results an even narrower cooling range is employed, namely from between about 6° F. to about 9° F. per minute. The bulk density of dried product obtained by cooling in this manner varies between about 8 and about 20 pounds per cubic foot, more usually between about 12 and about 15 pounds per cubic foot.

The operating temperature range in the batch cooler is determined by the temperature at which the polymer precipitates from solution. This in turn is a function of the molecular weight of the polymer and the specific solvent or diluent used. For example, with an ethylene polymer having a molecular weight of between about 15,000 and 25,000, it has been found that a substantial portion of the polymer will precipitate from isooctane at about 180° F. and from cyclohexane at about 165° F. When a heavier polymer, for example, an ethylene polymer having a molecular weight between about 35,000 and about 45,000 is treated, precipitation takes place from cyclohexane at about 170° F. In general, it is desirable that the concentration of polymer in the diluent entering the cooling zone be maintained at a low level, usually between about 1 and about 15 percent by weight and preferably between about 3 and about 5 percent by weight.

When treating the polymer, as described, it is desirable to remove by precipitation a major portion of the polymer which is contained in solution. Usually, precipitated polymer in the slurry leaving the cooling zone comprises at least 90 to 98 percent by weight of the polymer introduced thereto. However, smaller quantities of polymer can be precipitated and the material which remains dissolved in the diluent leaving the cooling zone may amount to as high as 15 to 25 percent or higher of the polymer introduced to this zone.

A number of methods are available for providing the cooling required. Although any of these methods may be used, the preferred method of operation employs auto-refrigeration, whereby the cooling required is provided by vaporization of diluent from the solution in the batch cooling zone. When operating in this manner, it is not necessary to provide agitation since boiling of the solvent from the cooling zone serves to create turbulence in the solution. Also, cooling by auto-refrigeration substantially eliminates variations in temperature in different parts of the cooling zone, which may be present when other methods of cooling are used. It is desirable to maintain a relatively high ratio of solvent to polymer in the cooling zone. This is easily accomplished when cooling by auto-refrigeration by introducing make-up solvent into the cooling zone to replace that vaporized during cooling.

The polymers employed in the practice of the invention are granular or particulate, porous, precipitated polymers which have been precipitated from the solvent in which they were formed, either by addition of cooled water to the polymer solution, or by cooling of said polymer solution to result in direct precipitation therefrom as described above. For convenience, the products of the above-described two precipitation methods are referred to herein as "water precipitated polymer" and "solvent precipitated polymer." Thus, herein and in the claims, unless otherwise specified, the term "precipitated polymer" is employed generically and includes both said water precipitated polymer and said solvent precipitated polymer; said term "water precipitated polymer" refers to a polymer which has been precipitated from the solvent in which it was formed by adding water to the polymer solution, and the term "solvent precipitated polymer" refers to a polymer which has been precipitated from the solvent in which it was formed by cooling of the polymer solution without adding water thereto, e.g., direct cooling as by auto-refrigeration.

So far as is now known, there is no significant difference between said water precipitated polymer and said solvent precipitated polymer. Both can be used in the practice of the invention with essentially the same results. However, said water precipitated polymer is presently preferred primarily because its process of manufacture is more conveniently controlled on a commercial scale, with the result that the product polymer is more uniform in its properties. The reason for the superiority of said precipitated polymers over the ground extruded polymers is not definitely known at present. Said precipitated polymers and said ground extruded polymers are identical chemically. Thus, it is presently believed that the differences are due to physical properties such as porosity and surface area. Said precipitated polymers are formed in porous granules having a highly irregular surface.

In addition to their superior oil adsorption characteristics, said precipitated polymers possess a number of other advantages over the ground extruded polymers. For example, said precipitated polymers are an intermediate product in the manufacture of the regular commercial extruded polymers and thus cost less. Said precipitated polymers do not need to be sintered or compressed under relatively high pressures as do other plastic materials referred to above. Also, said precipitated polymers are easily regenerated for reuse if desired.

While the invention has been described above with particular reference to removing oil from copper ammonium salt solutions it is not limited thereto. Said copper ammonium salt solution does, however, represent one of the most difficult solutions or media to treat for the removal of oil or other liquid contaminant therefrom. The reason for this is not definitely known at present. While it is not intended to limit the invention by any theory of operation, it appears the ammonia in said copper solution is soluble in the oil, or the ammoniacal nature of said copper solution imparts a limited solubility of oil therein, with the result that the ammonia apparently acts somewhat as an emulsifying agent for said oil, thus rendering said copper solutions much more difficult to treat than ordinary water which contains oil as a contaminant.

The invention can also be employed to remove oil from other liquid media such as other aqueous salt solutions. One particularly useful application of the invention is in the removal of oil from steam condensate. Oil in steam condensate tends to accumulate in the boilers and thus aggravate the "mud" problem in boilers. Steam condensate will frequently contain from 30 to 40 or more parts by weight of oil per million parts by weight of condensate. The invention can be employed to reduce the oil content to from 2 to 4 parts, or less, by weight per million parts by weight of condensate. Another example is removal of oil from amine solutions used to treat hydrocarbon gases and other gases for removal of hydrogen sulfide and other impurities. Such solutions can be treated as described above for the copper ammonium salt solutions with equally as good or superior results.

The invention is not limited to removing oil from liquid media such as water and aqueous solutions. The invention can also be employed to remove entrained oil from compressed gases such as compressed air. For example, instrument air used as the actuating agent in pneumatic control systems.

Also, other immiscible liquid contaminants other than oil can be removed from fluids such as gases and liquids. Thus, the invention is not limited to the removal of oil from fluids. The invention can be employed to remove from fluids any liquid immiscible contaminant which can be adsorbed therefrom by the granular, porous, precipitated polymer of the invention.

The term "oil" as used herein and in the claims, unless otherwise specified, includes both vegetable and mineral oils of any type which is immiscible with the medium from which it is to be separated.

The invention is not limited to any particular form of apparatus for carrying out the method of the invention. Any suitable apparatus can be employed for slurrying the precipitated polymer of the invention with a liquid to be treated. Likewise, any suitable form or arrangement of fixed contacting bed can be employed in the practice of the invention for contacting a fluid, either gas or liquid, with the precipitated polymer. As will be understood by those skilled in the art, the particular form, thickness, and arrangement of the bed or beds will depend upon the nature of the contaminant to be removed and the nature of the medium from which the contaminant is to be removed.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. A process for removing an immiscible liquid lubricating oil contaminant from an aqueous solution of a copper ammonium salt in which said contaminant is entrained, which process comprises: passing said solution through a contacting zone containing a fixed bed of a porous, granular, precipitated polymer of a 1-olefin containing from 2 to 4 carbon atoms per molecule; adsorbing said contaminant on said polymer; and recovering a substantially oil-free copper ammonium salt solution from said contacting zone.

2. A process according to claim 1 wherein said polymer is a polymer of ethylene.

3. A process according to claim 1 wherein said polymer is polyethylene.

4. A process for removing an immiscible liquid lubricating oil contaminant from an aqueous solution of a copper ammonium salt in which said contaminant is entrained, which process comprises: forming in a contacting zone a slurry of said solution and a porous, granular, precipitated polymer of a 1-olefin containing from 2 to 4 carbon atoms per molecule; adsorbing said contaminant on said polymer; passing said slurry from said contacting zone to a polymer separation zone; and recovering substantially oil-free copper ammonium salt solution from said separation zone.

5. A process according to claim 4 wherein said polymer is a polymer of ethylene.

6. A process according to claim 4 wherein said polymer is polyethylene.

7. A process for removing a contaminating liquid oil from an aqueous solution of a copper ammonium salt, which process comprises: passing said aqueous solution containing said oil to a contacting zone and therein contacting same with a porous granular precipitated polymer of a 1-olefin containing from 2 to 4 carbon atoms per molecule; and recovering a substantially oil-free copper ammonium salt solution from said contacting zone.

8. A process according to claim 7 wherein said polymer is a polymer of ethylene.

9. A process for removing a contaminating lubricating oil from an aqueous solution of a copper ammonium salt, which process comprises: passing said aqueous solution containing said oil through a contacting zone containing a fixed bed of a porous granular precipitated polymer of a 1-olefin containing from 2 to 4 carbon atoms per molecule; recovering substantially oil-free copper ammonium salt solution from said contacting zone; and subsequently desorbing adsorbed oil from said bed of polymer to regenerate same.

10. A process for removing an immiscible liquid lubricating oil contaminant from an aqueous solution of a copper ammonium salt in which said contaminant is entrained, which process comprises: contacting said solution in a contacting zone with a porous, granular, precipitated polymer of a 1-olefin containing from 2 to 4 carbon atoms per molecule; adsorbing said contaminant on said polymer; and recovering a substantially oil-free copper ammonium salt solution from said contacting zone.

11. A process for removing a contaminating liquid oil from an aqueous solution of a copper ammonium salt, which process comprises: passing said aqueous solution containing said oil to a contacting zone and therein contacting same with a porous, granular, precipitated polyethylene; and recovering a substantially oil-free copper ammonium salt solution from said contacting zone.

12. In a process for the removal of carbon oxides from ammonia synthesis gas containing entrained lubricating oil, in which process said synthesis gas is contacted in an absorption zone with a solution of a copper ammonium salt with which said oil is immiscible whereby said carbon oxides are absorbed by said solution and removed from said synthesis gas, said entrained oil also being removed from said gas by said solution, said solution containing said absorbed carbon oxides and said oil is then passed through a regeneration zone wherein said carbon oxides are released and the salt in said solution regenerated and said regenerated solution still contains an appreciable amount of oil entrained therein, and said regenerated solution is recycled to said absorption zone, the improvement comprising: passing said regenerated solution to a contacting zone and therein contacting same with a porous, granular, precipitated polymer of a 1-olefin containing from 2 to 4 carbon atoms per molecule; recovering a substantially oil-free regenerated copper solution from said contacting zone; and then recycling said substantially oil-free solution to said absorption zone.

13. A process according to claim 12 wherein said copper ammonium salt is copper ammonium formate and said polymer is polyethylene.

14. A process according to claim 12 wherein said copper ammonium salt is copper ammonium acetate and said polymer is polyethylene.

References Cited by the Examiner

UNITED STATES PATENTS

| | | | |
|---|---|---|---|
| 1,748,051 | 2/30 | Barton | 55—22 |
| 2,600,106 | 6/52 | Garrett | 210—23 X |
| 2,849,082 | 4/58 | Giammarco | 55—68 |
| 2,858,902 | 11/58 | Cottle | 55—74 |
| 2,965,445 | 12/60 | Goens et al. | 210—500 |
| 3,056,772 | 10/62 | Wallace | 260—93.7 X |
| 3,068,627 | 12/62 | Sherwood | 55—22 |

FOREIGN PATENTS

| | | |
|---|---|---|
| 829,413 | 3/60 | Great Britain. |

REUBEN FRIEDMAN, *Primary Examiner.*

NORMAN YUDKOFF, *Examiner.*